(12) United States Patent
Zheng et al.

(10) Patent No.: US 12,450,280 B1
(45) Date of Patent: Oct. 21, 2025

(54) PERSONALIZED MEDIA RECOMMENDATIONS FOR MULTI-MODAL DEVICES

(71) Applicant: Amazon Technologies, Inc., Seattle, WA (US)

(72) Inventors: Yu Zheng, Mountain View, CA (US); Shawn S. Le, San Francisco, CA (US); Andres Santiago Valencia Convers, New Westminster (CA); Harold Ngulube, Roswell, GA (US); Gary William Kamikawa, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/816,591

(22) Filed: Aug. 27, 2024

(51) Int. Cl.
*G06F 16/435* (2019.01)
*G06F 9/54* (2006.01)
*G06F 16/438* (2019.01)

(52) U.S. Cl.
CPC ............ *G06F 16/435* (2019.01); *G06F 9/543* (2013.01); *G06F 16/438* (2019.01)

(58) Field of Classification Search
CPC .............................. G06F 16/435; G06F 16/438
USPC ........................................................ 707/722
See application file for complete search history.

(56) References Cited

U.S. PATENT DOCUMENTS

| | | | | |
|---|---|---|---|---|
| 2008/0268791 | A1* | 10/2008 | Shteyn | G06Q 30/00 455/73 |
| 2023/0004996 | A1* | 1/2023 | Ashley | G06Q 30/0203 |
| 2024/0338743 | A1* | 10/2024 | Docherty | G06Q 30/0631 |
| 2024/0340499 | A1* | 10/2024 | Docherty | H04N 21/4668 |

* cited by examiner

*Primary Examiner* — Kimberly L Wilson
(74) *Attorney, Agent, or Firm* — Athorus, PLLC (57) ABSTRACT

Described are systems and processes providing recommendations to multi-modal devices. A media service may receive an API requesting recommendations for media content. The API may include a hard coded media type for recommendations. To personalize content, a media service may send an attribute with the API, where the attribute indicates a different media type other than the hard coded media type for the recommendations. Recommendations may be based on a schedule, user information, device information, or a combination thereof.

20 Claims, 8 Drawing Sheets

PERSONALIZED MEDIA RECOMMENDATIONS FOR MULTI-MODAL DEVICES

BACKGROUND

Many people use media services to access media content such as music, podcasts, audio books, and other content. While these services allow users to find and playback content, the services also seek to help provide users with new offerings and recommendations to create an enriched user experience. For example, during playback of media content or at other times, a media service may provide recommendations and provide other content to users, such as by pushing content to user devices that access the media service.

Users often want to learn about new and interesting artists as well as have access to time relevant media, such as seasonal offerings or current trends. In addition, users often want recommendations that are personalized based on the user's interaction history. For example, if a user primarily listens to hip hop and rhythm and blues (R&B), then the user would likely expect recommendations to be primarily from these genres.

Recommendations can be provided in different formats. For music, recommendations may be provided as playlists, as individual tracks, by artist, by stations, among many possible options. Some services have fixed recommendations, such as providing recommended playlists but not providing recommended songs or recommended artists. This may result in a poor experience for users.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a media service to provide personalized content recommendations to users of multi-modal devices and possibly other devices. Multi-modal devices include devices having at least a speaker, microphone, display, and network connectivity. Examples of multi-modal devices are smartphones, smart televisions, and personal assistant devices, such as the Echo Show provided by Amazon.com. Meanwhile, the content may include any media, such as audible and/or visual media, such as music, podcasts, audiobooks, videos, artistic performances, artwork, advertisements, facts, weather information, and/or other media capable of output to users via the multi-modal devices.

In some legacy systems, application program interfaces (APIs) are used to retrieve displayable content recommendations for users. One such API is called "GetDisplayableContent" (or "GDC API"), which is a public API and is used to retrieve content recommendations to display to users. While the GDC API works effectively for this purpose, it has some drawbacks. For example, the GDC API has a fixed or hard coded media type for each recommendation service. The media type is the type of content provided to the user device, such as music playlist, music tracks, stations, music artists, podcast topics, audible book authors, and so forth. Using only the GDC API, a recommendation service may only provide a certain fixed media type such as a playlist. Another recommender may be limited to only "stations for you" when using the GDC API. Further, if a user is new to the service, the GDC API may return null results since no results may be matched by a recommender without user history created from prior use of the media service. Thus, a media service is limited in what content can be recommended to users when relying solely on the GDC API to pass information to recommender services.

As discussed herein, in accordance with various embodiments, the media service may create an attribute for association with the GDC API where the attribute indicates a different type of media (or multiple types) for use to fulfill content recommendations, thus overriding the GDC API's fixed media type limitation. In some embodiments, the attribute may include information, such as one or more designated media types, device information, and/or user information. For example, the attribute may include information for designated media types based on user attributes, a device type used by the user, and/or based on other factors or a combination thereof.

In some embodiments, a marketing team (or other entity) may create a schedule of content to be recommended to certain users of the media service. The schedule may enable A/B testing and may include multiple different possible outputs for a certain time range in the schedule. The schedule may include a start and stop time where recommendations of a certain type are provided to users. The schedule may include criteria or attributes for users to have or possibly not have in order to receive certain recommendations. As an example, the schedule may include criteria of hip hop and R&B listening history for a user to receive a recommendation of R&B holiday songs, which may have a start time of December 1 and an end time of December 31 for any given year, thus providing recommendations of R&B holiday music to users with listening history of this genre or related genres during this holiday season. The schedule may enable providing certain recommended content to users via the GDC API sent with the attribute.

In accordance with one or more embodiments, content recommendations that are provided to users may be personalized based on factors such as user history, user attributes, a type of device that accesses the media service, and/or other factors. The user history may be associated with a user account and may include user history of a specific type (e.g., music listening history) or general user data, which may include purchase history, browsing history, and/or other types of electronic user interaction data captured by the media service or otherwise made available to the media service. The user attributes may include attributes of a user associated with a user account. User attributes and/or user data may include an age, gender, education level, a location, identified preferences, and so forth. A type of device may include specific models of devices, devices with certain hardware (e.g., with display screens greater than three inches, etc.), and/or other hardware groupings. The use of user history, user attributes, and/or user device data may enable personalization of content recommendations to users.

In some embodiments, a recommender may provide multiple recommendations for a user device in response to a request initiated by the GDC API and associated with an attribute, as discussed above. The media service may then select (or filter) a subset of the recommendations to provide to the user device based on user history, user attributes, and/or a type of device, among other possible factors. In some embodiments, recommendations may be ranked such that a highest ranking recommendation that can be fulfilled with media content is provided to the user. The media service may associate content items with the recommendations. The content items may be consumable (e.g., playable, etc.) content such as tracks of music, while the recommendations may be titles of music that may or may not be linked to actual playable or otherwise consumable content.

When a new user first accesses the media service, the user may not have user history, subscriptions, and/or other information associated with certain media (e.g., music) to enable personalized content recommendations (e.g., personalized music recommendations) to be provided via the media service and recommenders based on history of that media. However, the users may have user data associated with other media, purchases, user actions, electronic services, or other relevant interaction data that may be useful in personalizing content recommendations. For example, user purchase history data obtained from user interaction with a retail site may be used to recommend music content to a new user of a music service assuming the user provides consent to use the purchase history data. This data is referred to herein as "cold start data," which may use other user interaction data to make recommendations for content of a different type (e.g., use retail interaction data to recommend audiobooks or music that is personalized for a user, etc.). In such cases, and in other cases where recommendations cannot be properly fulfilled (e.g., null data, error, etc.), cold start data may be used by the media service to provide other recommendations to the user. When the user has no history from other interactions, then popular content may be recommended based on user activity of other users. As an example, a new user may create an account and access the media service for a first time. The media service may send one or more requests to recommenders to provide content recommendations to the user device that are personalized for the user (via information associated with the new user account). However, some or all recommenders may not provide useful results, and thus may return null values, errors, and/or results that are not personalized for the user. In these situations, the media service may attempt to use cold start data to provide cold start recommendations to the user device for the user, such as until the user acquires enough user history with the new media service to enable the recommenders or the media service to provide personalized recommendations using data from the media service. When cold start recommendations are not possible, then the system may make recommendations based on user activity of other users, such as to recommend popular content.

Figure 1:
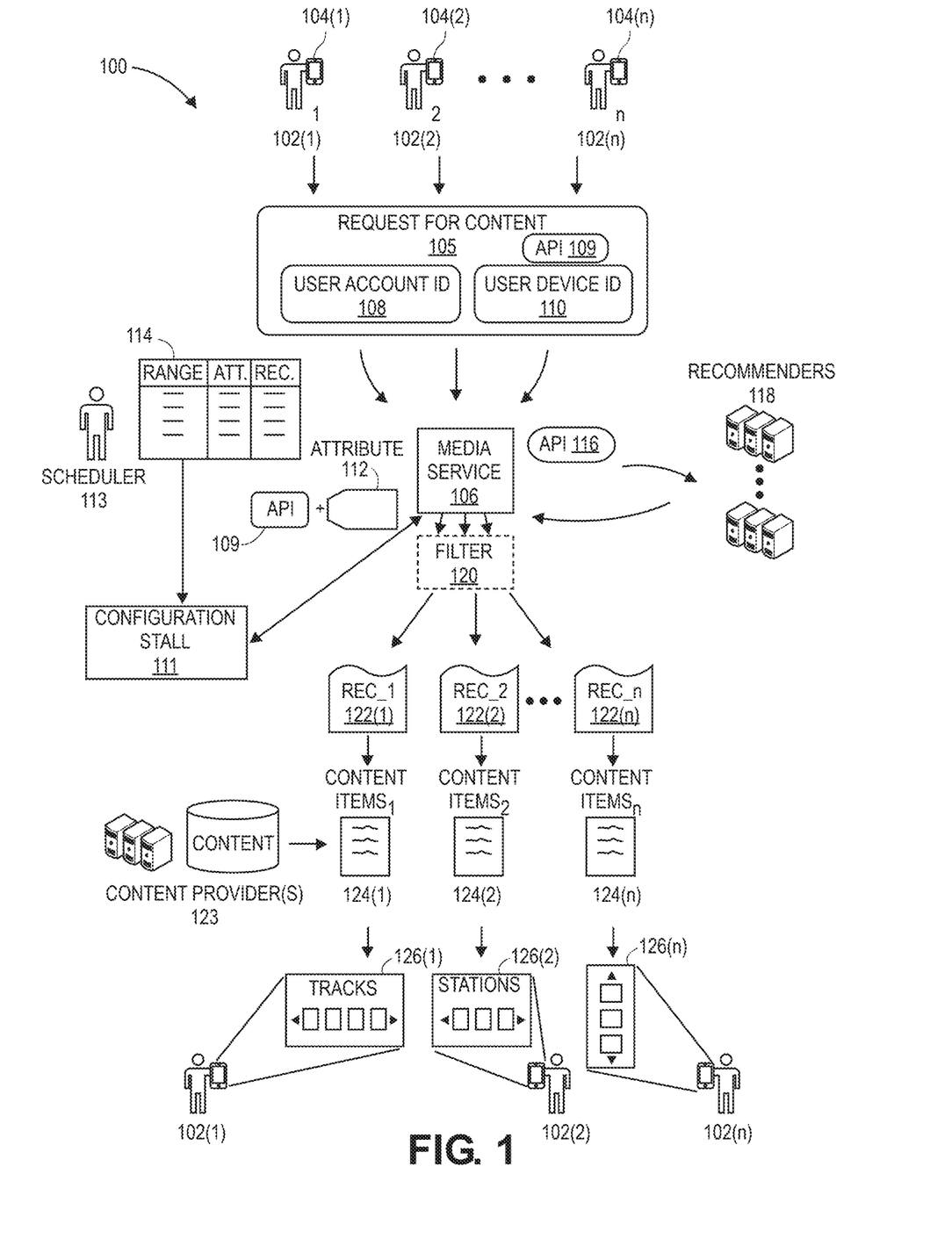
FIG. 1 is a schematic diagram showing an illustrative computer-implemented process to provide personalized content recommendations to users of a media service, according to an implementation.

FIG. 1 is a schematic diagram showing an illustrative computer-implemented process 100 to provide personalized content recommendations to users of a media service, according to an implementation. As shown in FIG. 1, users 102(1), 102(2), . . . 102(n) may each be associated with a respective user device 104(1), 104(2), . . . 104(n). However, some users may be associated with multiple user devices. The user devices may be multi-modal devices capable of providing audible and visual outputs. For example, the user devices may include a display, a speaker, a microphone, and network connectivity. The user devices may include virtual assistant devices, such as an Echo Show provided by Amazon.com, which may be connected to a media service to receive media for consumption by a user. However, the user devices may include other devices with similar functionality as well as smartphones, smart watches, personal computers, tablets, and so forth.

The user devices 104(1)-(n) may send a request for content 105 to a media service 106. In some embodiments, the request may include a user account identifier 108 and/or a user device identifier 110, each being specific to the user device sending the request. The request for content 105 may include an API 109 to provide recommendations to the user device. The API 109 may be the GDC API that includes the default media type. The request for content may include a request to play some media available for output via one of the user devices, which in turn creates user interaction history. In some instances, the request for content may be initiated by logging into an account, turning on a device, connecting to a media service, or through similar operations.

The media service 106 may create an attribute 112 for association with the API 109. The attribute 112 may override a default media type designated in the API 109 for the content recommendations. In some embodiments, the attribute 112 may be a binary value such that the attribute is active/present when having a certain value (e.g., 1 or 0). However, in some embodiments, the attribute may include some data, such as device type data, user data, media type data, and/or other data.

The media service 106 may send the API 109 and the attribute 112 to a configuration stall 111. The configuration stall 111 may create or determine one or more requests for content recommendations. In some embodiments, the configuration stall 111 may determine the one or more requests based at least in part on a schedule 114, a type of user device, user attributes, and/or other data. The configuration stall 111 may create one or more requests that can be sent to recommenders 118 to provide recommendations of content.

A marketer, or scheduler 113 may create the schedule 114 for recommendations. The schedule 114 may include a time range, such as a start time and an end time for recommendations, attributes of candidates to receive the recommendations or not to receive certain recommendations, and information about content recommendation (e.g., a media type, media tracks, etc.), among other possible data. In some embodiments, the schedule 114 may enable A/B testing, such as testing of different recommendations to different groups. The schedule 114 may be later updated based on results of the A/B testing, such as based on interaction data collected from users that access or do not access recommendations based on the schedule 114.

The media service 106 may send the one or more requests determined by the configuration stall 111 to one or more recommenders 118, possibly in parallel requests. The recommenders 118 may be services that provide content recommendations, such as recommended playlists of music, top music artists, recommended podcasts, and so forth. The recommenders may be content providers. The recommenders may be other services, such as machine learning models, Large Language Models (LLMs), and/or other algorithms or systems.

The media service 106 may send an API call 116 to the one or more recommenders 118 where the API call 116 includes at least part of the one or more requests determined by the configuration stall 111. The API call 116 may be a "get recommendations" API, for example. In response to receiving the API call 116, the one or more recommenders 118 may provide recommendations to the media service 106, which may be filtered using a filter 120 to determine recommendations 122(1), 122(2), . . . , 122(n) for each of the user devices 104(1), 104(2), . . . 104(n), respectively. The filter 120 may apply a ranking to select the recommendations or apply other logic, such as selecting first results received, valid results (not null), or by implementing other logic to select the recommendations or portions thereof that are then passed to the user devices.

In some embodiments, one or more of the recommendations 122(1), 122(2), . . . , 122(n) may include null data or otherwise be incomplete or may not be received from a recommender, such as for new users. In these situations, cold start data may be provided based on user interaction with other types of media or data to provide personalized media content for these new users. When cold start data is not available, the service may include content selected based on user activity of other users to provide popular content to the user.

In some embodiments, content provider(s) 123 may provide content items for the recommendations, such as when the recommendations include data indicating a title and creator (e.g., author, artist, producer, etc.). However, some of the recommendations may include the content directly from the recommenders 118. The recommendations may include multiple tracks of content items 124(1), 124(2), . . . 124(n). The media service 106 may select at least a portion of the content items for each recommendation for delivery to a respective user device via user interfaces 126(1), 126(2), . . . 126(n).

The user interfaces 126(1), 126(2), . . . 126(n) may provide at least a portion of the content items 124(1), 124(2), . . . 124(n) to the user devices 104(1), 104(2), . . . 104(n), respectively. The user interfaces may be selected based on the attribute 112 that specifies the media type, for example. However, in some instances, the attribute 112 may specify multiple media types and the user interfaces may be selected based on a selected recommendation.

Figure 2:
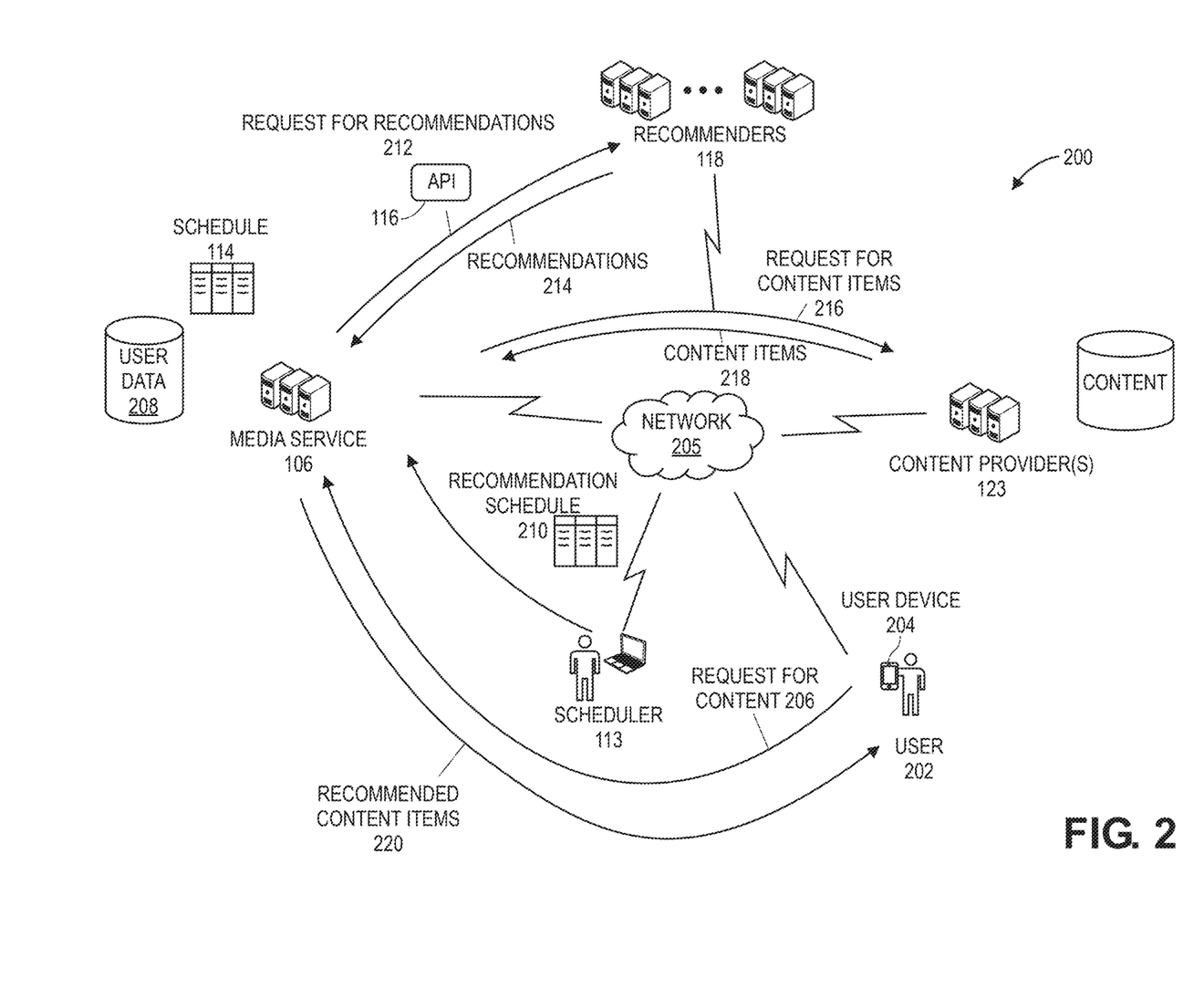
FIG. 2 is a schematic diagram of an illustrative environment to provide personalized content recommendations to users of a media service, according to an implementation.

FIG. 2 is a schematic diagram of an illustrative environment 200 to provide personalized content recommendations to users of a media service, according to an implementation. The environment 200 includes a user 202 associated with a user device 204. The user device 204 may be a multi-modal device that includes at least a display, a speaker, a microphone, and network connectivity. The user device 204 may be in communication with the media service 106 via one or more network(s) 205. The network(s) 205 may include wireless and/or wired networks, and may be wide area networks, local networks, mobile networks, or any other type of networks that facilitate secure and/or possibly unsecure exchange of data. The network(s) 205 may enable exchange of data between other devices shown in the environment 200, such as between the media service 106, the recommenders 118, and the content providers 123, for example.

The user device 204 may send a request for content 206 from time to time to the media service to receive content for playback on the user device 204. The content may be media content, such as music, videos, information, audiobooks, podcasts, news, advertisements, artwork, photographs, and/or any other digital information for consumption by the user 202 via the user devices 204. The request for content 206 may be stored with other data as user data 208, which may be queried to determine information about a user, such as preferences of the user 202 and to personalize recommendations for the user 202. The user data 208 may include user attributes, such as demographic information (e.g., age, gender, location, etc.), subscriptions to services (paid, free, etc.), and/or user history (e.g., content accessed, etc.). In some embodiments, the user device may send an API call to the media service for recommendations. The API may be part of the request for content 206. In various embodiments, the API may be the GDC API.

The media service 106 may access or receive from time to time the schedule 114 from the scheduler 113. For example, the scheduler 113 may send a recommendation schedule 210 to the media service 106 via the network(s) 205, which may be used as the schedule 114 or may update the schedule 114. The schedule 114 may include recommendations to be provided to the user device 204 and other user devices. The schedule 114 may include a start date/time, an end date/time (collectively a date range), attributes for selection of devices/users, and scheduled recommendations. In some instances, the schedule 114 may enable A/B testing of different scheduled recommendations. As an example, the schedule 114 may initiate recommendations of seasonal content during certain dates.

The media service 106 may seek to determine recommendations to provide to the user device. The recommendations may be pushed to the user device 204 and/or may be provided to the user device 204 in response to a request from the user device 204, such as the API call (e.g., a GDC API call, etc.). The media service may use a configuration stall (such as the configuration stall 111 shown in FIG. 1) to determine one or more requests to send to recommenders 118 to determine recommendations. In some embodiments, the media service 106 may determine which recommenders 118 to receive requests based on the output of the configuration stall, which may use the schedule 114.

As discussed above, the media service may receive an API from the user device where the API includes a fixed media type, such as a media type of "playlist" or "station" for a given recommender. To enable receipt of other media types or to override the fixed media type (default) in the API, the media service may create an attribute, such as the attribute 112 shown in FIG. 1. The attribute 112 may be a generic indicator to indicate a request for other media types. In some embodiments, the attribute 112 may include data or metadata indicating a certain media type or certain types of media requested from the recommenders 118. The data included in the attribute 112 may be generated based on the type of the user device 204, the schedule 114, and/or the user history, among other possible data sources. The media service may send the API and the attribute 112 to the configuration stall to determine one or more requests for recommendations. The configuration stall may use the schedule 114 to determine the one or more requests, among other possible data.

The media service may create or otherwise use the API call 116 to transmit a request for recommendations 212 to one or more of the recommenders 118. The recommenders 118 may be media providing companies, which also provide content to user devices, such as the user device 204. The recommenders 118 may be services that include algorithms to generate recommendations based on data, such as user history, trending media, new media, etc. Some recommenders may use or be implemented by machine learning systems, Large Language Models (or "LLMs"), and/or other large scale systems. Some recommenders 118 may provide textual results, but not content for consumption by the user device 204. The recommenders 118, or a subset thereof, may send recommendations 214 to the media service 106 in response to receipt of the request 212 that includes the API call 116. The recommendations 214 may be in accordance with data included in the attribute and may include a media type that is different than a media type hard coded with the GDC API.

In some embodiments, the media service 106 may select a subset of the recommendations 214 for further processing (e.g., using the filter 120 shown in FIG. 1, etc.), possibly based on the schedule 114, the user data 208, and/or other information. For example, the media service 106 may select recommendations based on subscriptions of the user 202 and/or the schedule 114. The schedule may indicate a type of recommendation for the user 202 or a group of users with similar attributes as the user 202.

In various embodiments, the media service 106 may send a request for content items 216 via the network(s) 205 to one or more content providers 123 associated with content (e.g., media capable of display and/or playback on the user device 204, etc.). Some of the content providers 123 may be the same entity as some of the recommenders 118, such as when an entity both recommends content and provides the content. Content items 218 may be returned from the content provider(s) 123 to the media service 106. In some embodiments, when content is not available for a certain recommendation, such as the content does not exist or the user does not have access to it (e.g., no subscription, etc.), no data may be returned for that particular recommendation and/or request. When a user is new to the media service or has no user history or user data for a media service, no data may be returned from some of the content provider(s) 123 (or possibly from some of the recommenders 118), which may result in the media service 106 providing cold start data or popular content as discussed herein.

The media service 106 may receive the content items 218 from the content provider(s) 123. The media service 106 may select a subset of the content items to provide to the user device 204 as a recommendation. The selection may be based on the schedule 114, the user data 208 (e.g., user attributes, user history, etc.), and/or other information, such as a number or content times to recommend, user interface (UI) specifications, etc. The media service 106 may send the content items to the user device 204 as recommended content items, which may be displayed in a UI by the user device 204 from time to time.

Figure 3:
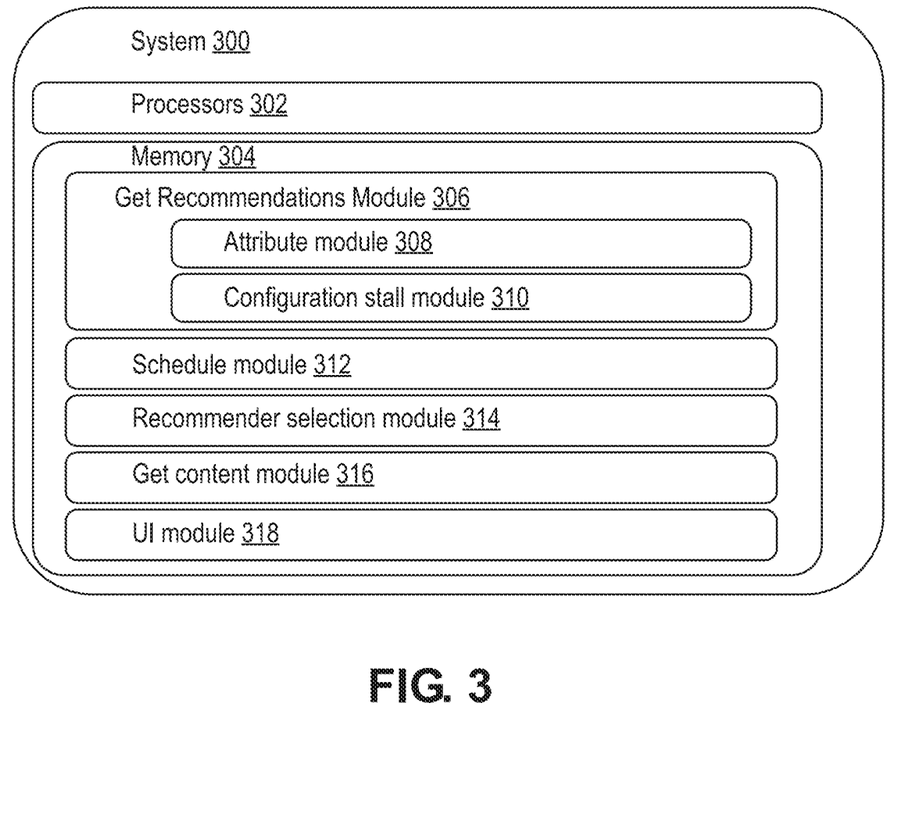
FIG. 3 is a block diagram of example software architecture including illustrative components to provide personalized content recommendations to users of a media service, according to an implementation.

FIG. 3 is a block diagram of example software architecture 300 including illustrative components to provide personalized content recommendations to users of a media service, according to an implementation. The architecture 300 may include one or more processors 302 and memory 304. The memory 304 may store executable program instructions to cause various actions described herein for the media service. For explanation purposes, the memory 304 is shown as storing certain modules. However, the memory 304 may store code and/or other computer instructions to accomplish similar actions discussed below. The memory 304 may include the example electronic data that follows.

A get recommendations module 306 may generate a request for recommendations for a user device, such as the user device 204 shown in FIG. 2. The get recommendations module 306 may include an attribute module 308 and a configuration stall module 310, among other possible modules or executable instructions/code.

The attribute module 308 may create an attribute in response to receiving an API call from a user device, such as from the GDC API that includes a fixed or default media type. The attribute may override the default media type and/or indicate one or more designated media type to be used instead of the default media type. The attribute module 308 may generate the attribute as binary data (e.g., present/absent) or the attribute module 308 may include data or metadata in the attribute, such as information about the user device, the user account, a designated media type, and/or other data.

The configuration stall module 310 may receive the attribute created by the attribute module 308 and may determine one or more requests for recommendations. The configuration stall module 310 may determine the one or more requests based on a schedule provided by a schedule module 312 (discussed below), a user device type, user attributes, and/or other data, including presence of the attribute which may be used to determine one or more designated media type for the recommendations. The configuration stall module 310 may create the one or more requests, which can be sent by the media service to recommenders, possibly in parallel, to obtain recommendations for a user device.

The memory 204 may include a schedule module 312. The schedule module 312 may implement a schedule, such as the schedule 114 discussed with reference to FIGS. 1 and 2. The schedule module 312 may get the schedule from the scheduler and may enforce or otherwise implement the schedule, such as via the configuration stall module 310. In some embodiments, the schedule module 312 may inform the get recommendations module 306 to indicate which recommendations to obtain.

The memory 304 may include a recommender selection module 314. In some embodiments, the recommender selection module 314 may perform functions similar to the filter 120 described with reference to FIG. 1. The recommendation selection module 314 may select a subset of recommendations received by the get recommendations module 306, for possible distribution to the user device of a user. The recommendation selection module 314 may be informed by the schedule module 312 to determine which recommendation(s) to select.

The memory 304 may include a get content module 316. The get content module 316 may request content items for at least some recommendations from content providers, such as the content providers 123 discussed with reference to FIGS. 1 and 2. For example, when a recommendation from a recommender includes a text recommendation, the get content module 316 may determine if associated content files are available for the text recommendation and may link or otherwise associate the files with the text recommendation to enable playback of content on a user device.

The memory 304 may include a UI module 318. The UI module 318 may provide a UI to the user device. The UI may include the content items, or a subset thereof, for consumption by a user of the user device. For example, the UI module 318 may send at a first time a digital "card" having certain content items from a first recommendation, which may be displayed by the user device for a first length of time. The UI module 318 may send at a second time another card having certain content items from a second recommendation, which may be displayed by the user device for a second length of time. The UI module 318 may use these cards, or other UIs, to provide the recommendations of content items to the user device for consumption by the user.

Figure 4:
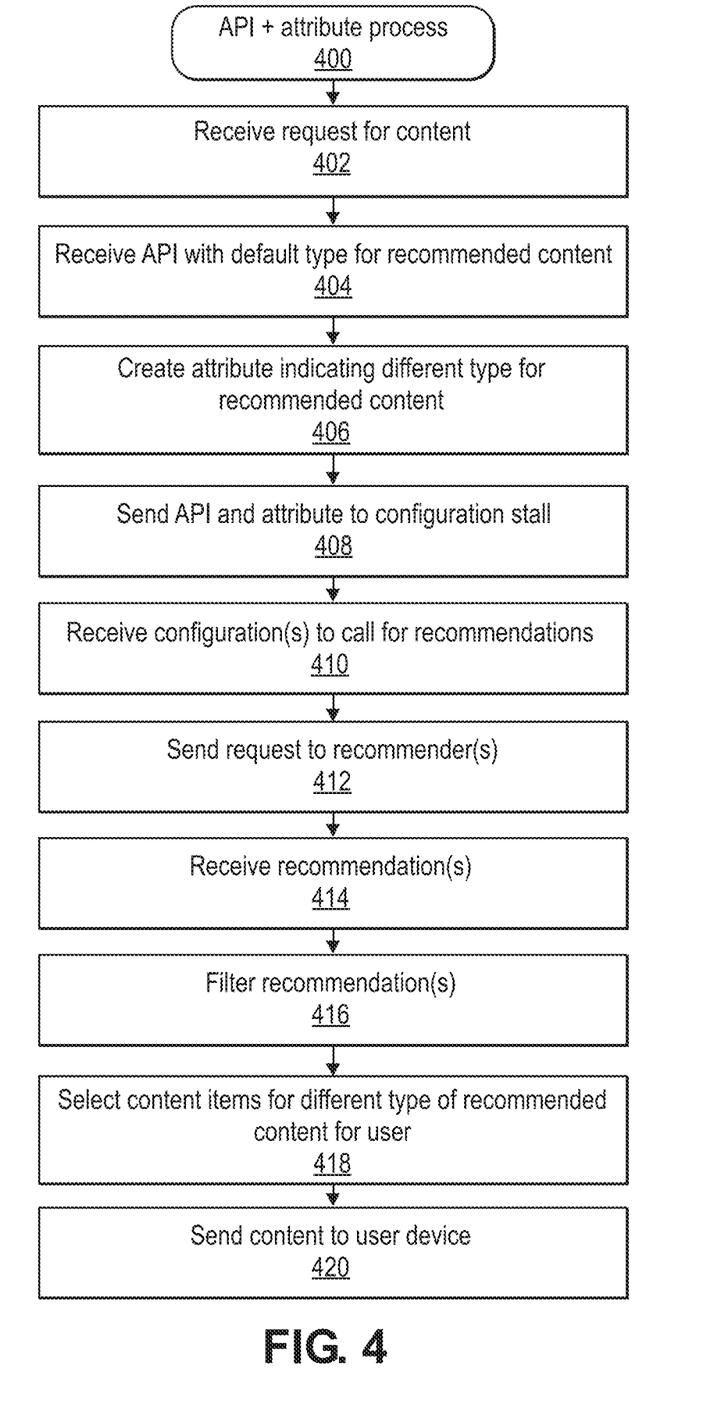
FIG. 4 is a flow diagram of an example process to provide an application program interface (API) and an attribute to override a default media type for personalized content recommendations, according to an implementation.

FIG. 4 is a flow diagram of an example process 400 to provide an application program interface (API) and an attribute to override a default media type for personalized content recommendations, according to an implementation. The example process of FIG. 4 and each of the other processes and sub-processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation and any number of the described operations can be combined in any order and/or in parallel to implement the routine. Likewise, one or more of the operations may be considered optional. Various operations from different processes may be combined in accordance with various embodiments.

The process 400 may begin by receiving a request for content from a user device, as in 402. The content may be any media capable of output on the user device. The media may be music, podcasts, audiobooks, videos, artistic performances, artwork, advertisements, news, recipes, and/or other media capable of output to users via a user device. The request for content may be a request for a recommendation. However, the request for content may be any request from the user device indicating that the user device is active and connected to a media service such as the media service 106 shown in FIGS. 1 and 2. The request for content may be sent in response to a user selection of content to initiate playback of access of that content. In some embodiments, the request for content may include an API call. The API call may have a fixed media type for content to fulfill the API call. For example, the API call may be a GDC API call.

The media service may receive the API call that includes a default media type, as in 404. The API may be received along with the request for content or may be triggered by other actions, such as a passage of time, information from a scheduler, a signal from a user device, or other triggers. The API may be the GDC API that includes the hard coded media type for each recommender service.

The media service may create an attribute indicating a different type of media for recommended content, as in 406. The attribute may be associated with the API that is received. The attribute may override the default media type indicated in the API call received at the operation 404. The attribute may include data indicating the different type of media or presence of the attribute with the API and may indicate an intent to use the different type of media. Thus, the attribute, when accompanying the API, may override the default media type indicated in the API.

The media service may send the API and the attribute to a configuration stall, as in 408. The configuration stall may access a schedule, user device information, user attributes/history, and/or other information to determine one or more requests for content recommendations of a designated media type that is different than the default media type in the API call based at least in part on presence of the attribute with the API call. For example, the configuration stall may access the schedule, such as the schedule 114 discussed with reference to FIG. 1, to determine media content to request from recommenders. The configuration stall may determine multiple requests, which may be sent to different recommenders for fulfillment. The configuration stall may determine requests in part on a type of user device to receive the request and/or user attributes (e.g., user history, user demographics, user preferences, etc.).

The media service may receive configuration(s) to call for recommendations, as in 410. For example, the media service may receive from the configuration stall the one or more requests for content recommendations. The media service may create an API to get recommendations from the recommenders, where the API is created at least in part using the one or more requests from the configuration stall.

The media service may send a request to the recommenders to provide recommendations for the user device, as in 412. The request may be the API, such as a "get recommendations" API. The recommenders may be service providers that offer content. The recommenders may also include other services that are capable of providing recommendations and may or may not be providers of media content, such as a machine learning model, an LLM, and so forth.

The media service may receive one or more recommendations from the recommenders, as in 414. The recommendations may be text, may include links to content, or may provide the content. In some instances, some recommenders may not provide results, such as when the user device is not associated with a subscription, a user account, or user history, for example.

The media service may filter recommendations to select one or more recommendations from the recommendations received from the recommenders, as in 416. In various embodiments, when multiple recommendations are received from the recommenders, the recommendations may be ranked to determine which recommendation or recommendations to provide to the user devices. The ranking may be based on relevance to other data, such as the user data, device data, a schedule, and/or other data. A top ranked recommendation may be selected for distribution to the user device. Other filtering techniques may be used to select a subset of recommendations. For example, recommendations that are not null may be selected, recommendations having current or new media may be selected, and so forth.

The media service may select content for the different type of media from the recommendations to provide to the user device as individual recommendations, as in 418. For example, the recommendations may include dozens of content items (e.g., tracks, podcasts, files, articles, etc., and the media service may select a subset of those content items to provide to the user device as recommendations. The selection may be based on a schedule, user preference, user history, random selection, or other techniques.

The media service may send the content items to a user device as recommended content, as in 420. For example, the media service may provide a UI to the user device that includes the content items, such as a collection of content items with a title of "artists you may like," "playlists for you," or using other titles and/or contextual information.

Figure 5:
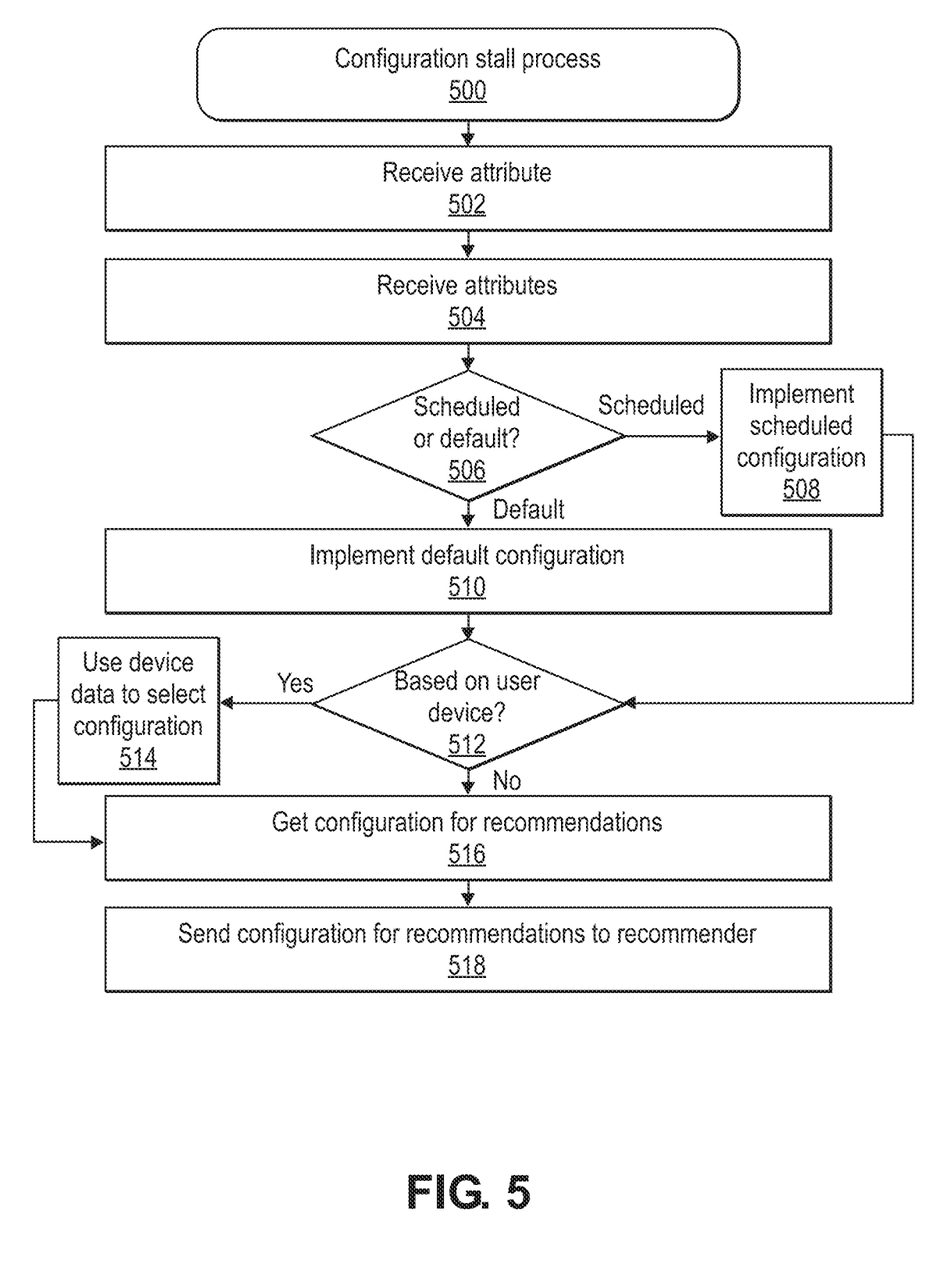
FIG. 5 is a flow diagram of an example process for a configuration stall, in accordance with disclosed implementations.

FIG. 5 is a flow diagram of an example process 500 for a configuration stall, in accordance with disclosed implementations. The process may be performed by the configuration stall 111 shown and described with reference to FIG. 1.

The process 500 may begin by receiving an attribute, by the configuration stall, as in 502. The configuration stall may use the attribute to determine a media type for use for requests for recommendations of content. In some embodiments, the configuration stall may determine to override a default media type included in an API call received by the configuration stall, such as the GDC API call.

The configuration stall may receive user attributes, as in 504. The user attributes may include user history, user subscriptions, user preference, user selections, user demographics, and/or other information about the user that may be used to determine requests for recommendations. In this way, the configuration stall may personalize requests for content recommendations. In some embodiments, user attributes may be included in requests for recommendations created by the configuration stall. However, in some embodiments, personalization of requests may be performed during content selection after recommendations are created.

The configuration stall may determine whether to create requests based on a schedule or default information, as in 506. When the configuration stall uses the schedule, such as the schedule 114, the process may proceed via the "scheduled" route to an operation 508.

The configuration stall may use the schedule to create the requests for recommendations, as in 508. For example, the configuration stall may apply user attributes to the schedule to determine content to be recommended to the user per the schedule. As an example, the schedule may indicate a recommendation for holiday music during a certain time period including a start date and end date. User attributes may be used to determine a type of holiday music (or other holiday content such as recipes, etc.). The schedule may be an A/B schedule that includes two or more groups that receive different recommendations to enable testing of recommendations. A/B testing is described further in reference to FIG. 6.

Returning to the operation 506, when the configuration stall uses the default, the process may proceed via the "default" route to an operation 510. Here, the configuration stall may implement a designated media type that is different than the default media type included in the API call. The designated media type may be selected by the configuration stall based on the user attributes, for example. However, the designated media type may be hard coded, or may be selected in other ways by the configuration stall.

Following the operations 508 and 510, the configuration stall may determine whether to use the device type for the request for content recommendations, as in 512. For example, the configuration stall may determine certain requests for content based on a type of device that is to receive the request. A device type may be a category of device (e.g., watch, fixed display, smart phone, etc.) or other grouping of devices, such as by a product line of devices (e.g., Echo Show, Samsung TVs, etc.). When the configuration stall is to use the device type, following the "yes" route from the operation 512, then the process may advance to an operation 514.

The configuration stall may use the device type to select a configuration, as in 514. For example, the configuration stall may select a portion of the schedule or the default information (operations 508 and 510, respectively) based on the device type.

When the device type is not used, following the "no" route from the operation 512 or following the operation 514, the configuration stall may determine the configurations for the recommendations, as in 516. For example, the configuration stall may create the request for content recommendations based on the schedule, default rules, and/or the user device in accordance with the operations 506-514.

The configuration stall may send the configuration for recommendations to the media service or the recommender, as in 518. For example, the configuration for recommendations may be one or more requests for recommendations. In some embodiments, the configuration stall may create an API call for the recommenders. The API call may be a "get recommendations" API call.

Figure 6:
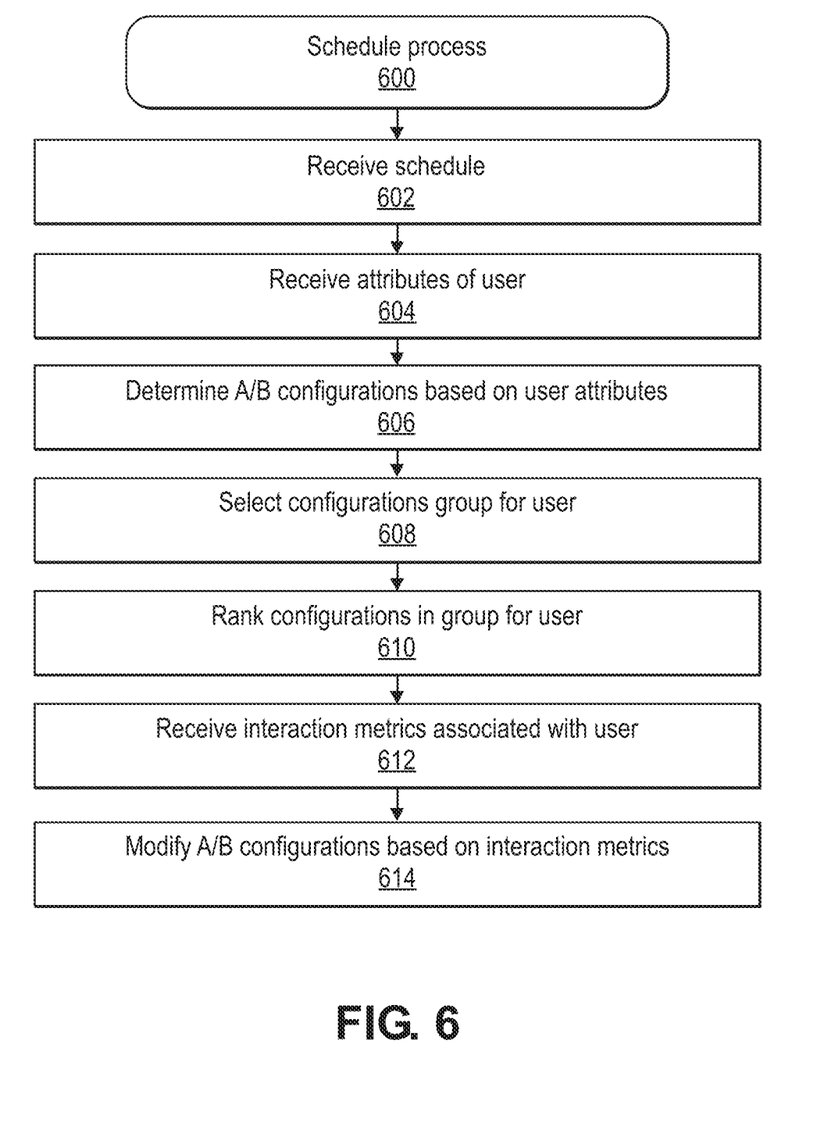
FIG. 6 is a flow diagram of an example process to use a schedule to provide content recommendations for delivery to users of a media service, according to an implementation.

FIG. 6 is a flow diagram of an example process 600 to use a schedule to provide content recommendations for delivery to users of a media service, according to an implementation. The process 600 may be performed in part by the configuration stall, the media service, or both.

The process may begin by receiving a schedule, such as the schedule 114 referenced in FIG. 1, as in 602. The schedule may be received from a scheduler 113 such as a marketer. The schedule may include an A/B schedule that enables A/B testing for different groups of users.

Attributes of the user may be received from the user device or from the media service, as in 604. For example, user attributes that are associated with a user device making a request for recommendation may be determined at the operation 604. The user attributes may include user history, user demographics, user preferences, user subscriptions, and/or other user data.

The schedule may be analyzed to determine A/B configurations based in part on the user attributes, as in 606. For example, the schedule may include different recommendations for a first group (A) and a second group (B), which may enable testing of different recommendations to similar users with similar attributes.

Configurations may be selected for a group of users, such as the (A) or the (B) configurations based on the user attributes, as in 608. However, more than two groups may be used, such as a group (C), (D), and so forth. The configurations may be created by the configuration stall. The configurations may be requests for recommendations of content.

The configurations may be ranked for a group of users, as in 610. In some embodiments, the ranking may occur after recommendations are returned from recommenders. The ranking may create a preference or priority of which configurations and/or recommendations to provide to a user device of the group of users. The recommendations may then be provided to the user devices for receipt and interaction by the users. Thus, the ranking may be performed based on user attributes, the recommendations received, and/or other factors. For example, null or error recommendations may be ranked low and may not be provided to user devices.

Interaction metrics may be received and associated with a user or group of users, as in 612. For example, after a user interacts with a recommendation, metrics including this interaction may be sent for analysis and feedback to the A/B testing of different configurations.

The A/B configurations may be modified based on the interaction metrics, as in 614. For example, the metrics may inform further deployment of configurations to groups, such as whether to discontinue certain configurations, increase deployment of certain configurations, and/or take other actions.

Figure 7:
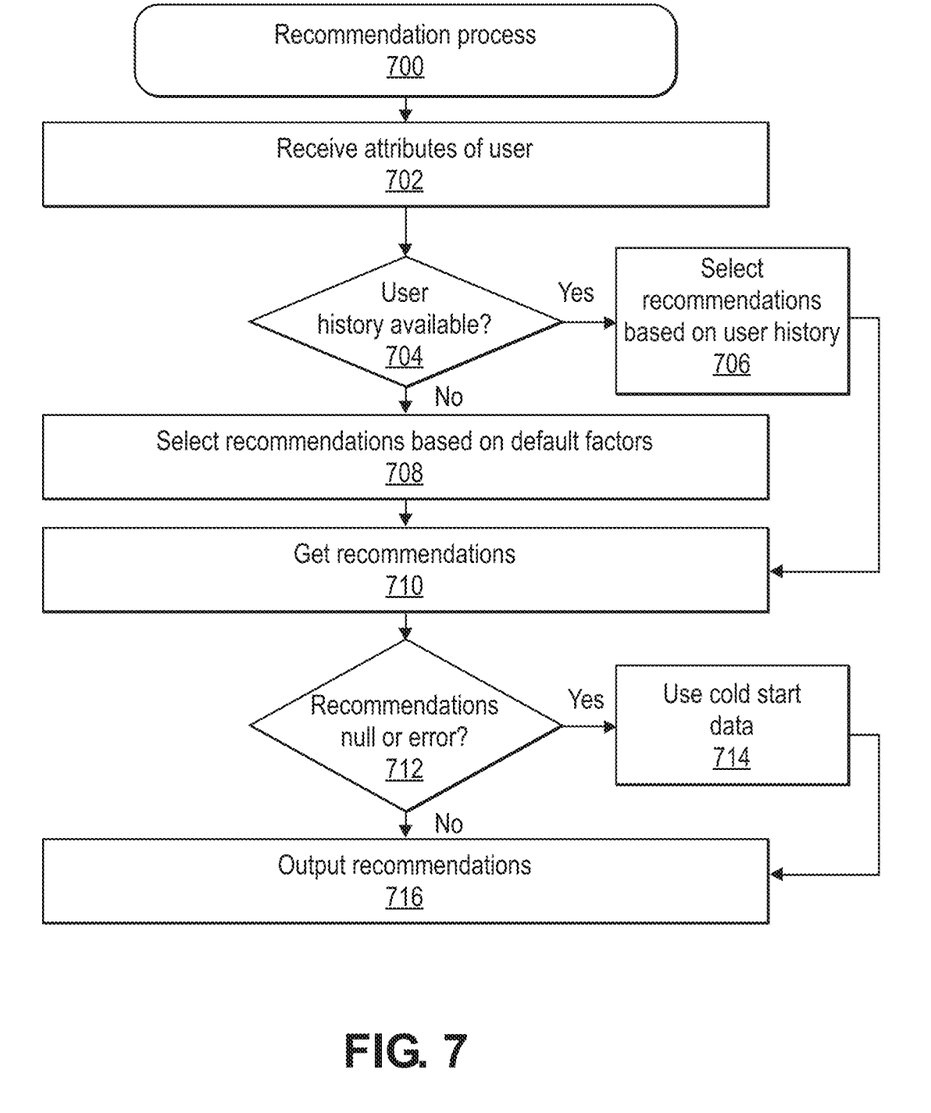
FIG. 7 is a flow diagram of an example process to determine recommendations based on cold start data, according to an implementation.

FIG. 7 is a flow diagram of an example process 700 to determine recommendations based on cold start data, according to an implementation. The process 700 may be performed by the media service 106, the configuration stall 111, or both as described with reference to FIG. 1.

The process 700 may begin by receiving attributes of a user, as in 702. The attributes may include user history, user subscriptions, user preferences, user demographics, user selections, and/or other user data. In some embodiments, no user attributes may be available or only limited user attributes may be available, such as for a new user that has a new user account.

A determination of whether history is available may be implemented, as in 704. When user history is available, such as included in the user attributes from the operation 702, then the process may advance to an operation 706 following the "yes" route from the operation 704.

Recommendations may be selected based at least in part on the user history, as in 706. For example, the configuration stall may create requests for content recommendations that include user history information to personalize recommendations for the user. In some embodiments, the user history information may be provided by the media service to recommenders.

When user history is unavailable (or an insufficient amount of user history is available), such as indicated in the user attributes from the operation 702, then the process may advance to an operation 708 following the "no" route from the operation 704. Recommendations may be selected based on default factors, as in 708. For example, the configuration stall may create requests for content recommendations that include default information based on preference of other users, such as to provide popular recommendations to the user device, which may be possibly associated with a new user.

Following the operations 706 and 708, the recommendations may be received from the recommenders, as in 710. The recommenders may process the requests in parallel or may process requests at different times and provide the recommendations to the media service.

The media service may inspect the recommendations to determine whether the recommendations include null values or errors, as in 712. For example, some recommenders may be unable to provide recommendations, may provide erroneous data, may provide null values, and/or may provide other data that is not usable as recommendations. For example, a request for a service that requires a subscription may provide a denial if the user device is not associated with a valid subscription.

When the recommendations include null values and/or errors, following the "yes" route from the operation 712, then the process may advance to an operation 714. The media service may implement cold start data as recommendations, as in 714. The cold start data may be based on user interaction data from use of other media or service different than the media service. Cold start data is personalized based on this other data. In contrast, popular recommendations are based on activity of other users and/or curated by other people, such as a marketer, other users, and so forth, and are not personalized. The cold start data may provide data for use by the user device until the user device is associated with adequate user history to create personalized recommendations for the particular media service. User history may be generated based on user interaction with media content via the user device.

When at least some recommendations do not include null values and/or errors, following the "no" route from the operation 712, then the process may advance to an operation 716. The media service may output the recommendations, as in 716, which include the personalized content based at least in part on the user history. The recommendations may be associated with content items, which may be output via the operation 716, as described above with reference to the operations 418 and 420 described with reference to FIG. 4.

Figure 8:
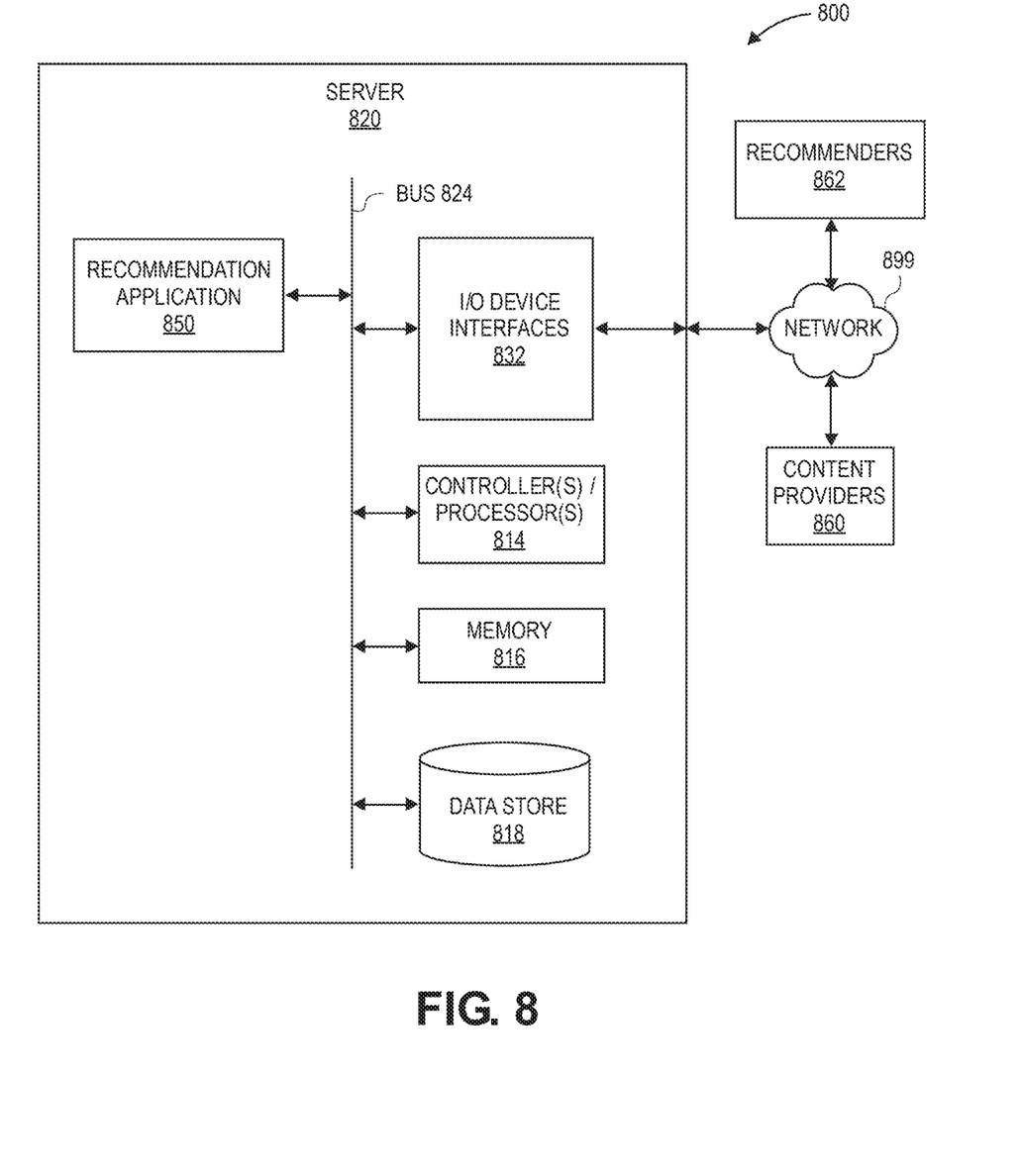
FIG. 8 is a block diagram of an illustrative implementation of a server system that may be used with various implementations.

FIG. 8 is a block diagram conceptually illustrating example components 800 of a remote computing device, such as a remote server 820 that may include and/or execute one or more of the above discussed implementations. Multiple such servers 820 may be included in the system.

Each of these server(s) 820 may include one or more controllers/processors 814, that may each include a central processing unit (CPU) for processing data and computer-readable instructions, and a memory 816 for storing data and instructions. The memory 816 may individually include volatile random access memory (RAM), non-volatile read only memory (ROM), non-volatile magnetoresistive random access memory (MRAM) and/or other types of memory. Each server may also include a data storage component 818, for storing data, controller/processor-executable instructions, training data, labels, access request log entries, access control policy sets, etc. Each data storage component may individually include one or more non-volatile storage types such as magnetic storage, optical storage, solid-state storage, etc. Each server may also be connected to removable or external non-volatile memory and/or storage (such as a removable memory card, memory key drive, networked storage, etc.), internal, and/or external networks 899 (e.g., the Internet) through respective input/output device interfaces 832.

Computer instructions for operating each server 820 and its various components may be executed by the respective server's controller(s)/processor(s) 814, using the memory 816 as temporary "working" storage at runtime. A server's computer instructions may be stored in a non-transitory manner in non-volatile memory 816, storage 818, and/or an external device(s). Alternatively, some or all of the executable instructions may be embedded in hardware or firmware on the respective device in addition to or instead of software.

Each server 820 includes input/output device interfaces 832. A variety of components may be connected through the input/output device interfaces. Additionally, each server 820 may include an address/data bus 824 for conveying data among components of the respective server. Each component within a server 820 may also be directly connected to other components in addition to (or instead of) being connected to other components across the bus 824. Each server may also include a recommendation application 850. The recommendation application may perform operations as discussed with reference to at least FIGS. 4-7 and may include some or all of the modules discussed with reference to FIG. 3. The server(s) 820 may be in communication with content providers 860 via the network 899, which may include candidate LLMs and/or one or more reference LLMs as discussed herein. The server(s) 820 may be in communication with recommenders 862 via the network 899.

The components of the server(s) 820, as illustrated in FIG. 8, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Moreover, with respect to the one or more methods or processes of the present disclosure shown or described herein, including but not limited to the flow charts shown in FIGS. 4, 5, 6, and 7, orders in which such methods or processes are presented are not intended to be construed as any limitation on the claimed inventions, and any number of the method or process steps or boxes described herein can be combined in any order, in parallel, and/or be omitted to implement the methods or processes described herein. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A system, comprising:
   one or more processors; and
   a memory storing program instructions that when executed by the one or more processors cause the one or more processors to at least:
   receive, from a user device in communication with a media service, an application program interface (API) call for media content, the API call designating a default media type for content recommendations;
   create an attribute for association with the API call, the attribute to override the default media type designated in the API for the content recommendations;
   send the API and the attribute to a configuration stall to determine one or more requests for the content recommendations, the configuration stall to determine the one or more requests based on the attribute and based at least in part on a schedule or a type of device;

send the one or more requests to one or more media recommender services that provide the content recommendations;

receive, from the one or more media recommender services, the content recommendations that include a media type that is different from the default media type designated in the API and are in compliance with at least one of the schedule or the type of device;

select content items included in the content recommendations;

create a user interface that includes at least some of the content items; and provide the user interface to the user device.

2. The system of claim 1, wherein the program instructions that when executed by the one or more processors further cause the one or more processors to at least:

access, by the configuration stall, the schedule to determine the one or more requests for the content recommendations, the schedule to provide:

a media type for the content recommendations that is different than the default media type; and data to create at least some of the one or more requests based at least in part on the type of device.

3. The system of claim 1, wherein:

the schedule includes a first group of data for a first group of users and a second group of data for a second group of users to enable A/B testing of different content recommendations.

4. The system of claim 1, wherein the program instructions that when executed by the one or more processors further cause the one or more processors to at least:

determine that the user request is associated with a new user account;

determine user interaction data associated with the user device based on user interaction with an electronic service that is different than the media service; and wherein the content recommendations are selected based at least in part on the user interaction data associated with the user device based on the user interaction with the electronic service.

5. A computer-implemented method, comprising:

receiving an application program interface (API) call from a user device for media content, the API call designating a default media type for the media content;

creating an attribute for association with the API call, the attribute to override the default media type designated in the API;

sending the API and the attribute to a configuration stall to determine one or more requests for content recommendations of a designated media type that is different than the default media type based at least in part on presence of the attribute;

sending, to one or more media recommender services, the one or more requests for content recommendations;

receiving, from the one or more media recommender services, one or more recommendations of the designated media type that is different than the default media type designated in the API;

determining content items that satisfy the one or more recommendations;

creating a user interface that includes at least some of the content items; and providing the user interface that includes the at least some of the content items to the user device.

6. The computer-implemented method of claim 5, further comprising:

receiving a schedule of content to be recommended to users; and wherein the content items are determined based at least in part on the schedule.

7. The computer-implemented method of claim 6, wherein:

the schedule includes at least:
a start date for content to be recommended;
an end date for the content to be recommended;
user attributes to be associated with the content; and
at least two requests to enable an A/B test of recommendations to users.

8. The computer-implemented method of claim 5, wherein:

the API call is associated with a user account; and
the content items are determined based at least in part on user attributes included in the user account.

9. The computer-implemented method of claim 5, further comprising:

determining the API call is associated with a new user account;

determine user interaction data associated with the user device based on user interaction with an electronic service that is different than the media service and wherein the content items are selected based at least in part on the user interaction data associated with the user device based on the user interaction with the electronic service.

10. The computer-implemented method of claim 5, further comprising:

selecting the designated media type based at least in part on a type of the user device.

11. The computer-implemented method of claim 5, further comprising:

receiving multiple recommendations from the media recommender service;

ranking the multiple recommendations; and selecting a recommendation based at least in part on the ranking.

12. The computer-implemented method of claim 5, further comprising:

determining a subscription of a user associated with the user device; and selecting the designated media type based at least in part on the subscription.

13. The computer-implemented method of claim 5, wherein the determining the content items that satisfy the recommendation further includes:

sending the one or more recommendations, a user account associated with the user device, and at least one user attribute to a content fulfillment service; and receiving, from the content fulfillment service, the content items.

14. The computer-implemented method of claim 5, wherein:

the content items include at least one of music, an audio book, a podcast, or a video.

15. A method, comprising:

receiving an application program interface (API) call from a user device for media content, the API call designating a default media type for the media content;

sending, to configuration stall, an attribute in association with the API call, the attribute to override the default media type designated in the API;

creating, by the configuration stall, one or more requests for content recommendations of a designated media type that is different than the default media type based at least in part on the attribute;

sending, the one or more media recommender services, the one or more requests for content recommendations;

receiving, from the one or more media recommender services, the content recommendations, wherein at least some of the content recommendations include the designated media type; and sending at least a portion of the content recommendations to the user device for placement in a user interface.

16. The method of claim 15, further comprising:

receiving a schedule of content to be recommended to users, the schedule including at least a start time and end time for distribution of the content; and wherein the content recommendations are determined based at least in part on the schedule.

17. The method of claim 15, wherein:

the request is associated with a user account; and the content recommendations are selected based at least in part on user history associated with the user account.

18. The method of claim 15, further comprising:

determining the API call is associated with a new user account; and wherein the content recommendations are selected based at least in part on user activity with electronic services that are different than media service receiving the API call.

19. The method of claim 15, further comprising:

selecting the designated media type based at least in part on at least one of a type of user device or a preference of the user.

20. The method of claim 15, wherein:

the user device is associated with a user having a subscription of a media service; and the content recommendations are selected based at least in part on the subscription.

\* \* \* \* \*